(12) United States Patent
D'Egidio et al.

(10) Patent No.: US 11,997,095 B2
(45) Date of Patent: May 28, 2024

(54) CONTENT PERMISSION PLATFORM

(71) Applicant: Comcast Cable Communications, LLC, Philadephia, PA (US)

(72) Inventors: Robb D'Egidio, Collingswood, NJ (US); Steven Leardi, Garrison, NY (US); Peter Simon, New York, NY (US); Marcus Loechner, New York, NY (US); Zhe Zhang, Wood Ridge, NJ (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 14/708,513

(22) Filed: May 11, 2015

(65) Prior Publication Data

US 2016/0337368 A1 Nov. 17, 2016

(51) Int. Cl.
*H04L 9/40* (2022.01)

(52) U.S. Cl.
CPC ................... *H04L 63/102* (2013.01)

(58) Field of Classification Search
CPC ....... H04W 4/12; H04W 48/02; H04W 48/08; H04W 63/102
USPC .......................................................... 726/4
See application file for complete search history.

(56) References Cited

U.S. PATENT DOCUMENTS

| | | | | |
|---|---|---|---|---|
| 8,600,928 B2* | 12/2013 | Landers | ................. | G16H 20/30 |
| | | | | 706/61 |
| 8,611,928 B1* | 12/2013 | Bill | ........................ | H04W 48/04 |
| | | | | 455/414.2 |
| 8,885,803 B2* | 11/2014 | Kent, Jr. | ................. | H04M 1/66 |
| | | | | 379/199 |
| 9,065,800 B2* | 6/2015 | Devarajan | ............... | G06F 21/51 |
| 2007/0150918 A1* | 6/2007 | Carpenter | ............... | G06F 21/10 |
| | | | | 725/25 |
| 2009/0113519 A1 | 4/2009 | Evans et al. | | |
| 2009/0320057 A1 | 12/2009 | Beaunoir et al. | | |
| 2010/0203901 A1 | 8/2010 | Dinoff et al. | | |
| 2012/0222107 A1* | 8/2012 | Sainio | .................... | G06F 21/554 |
| | | | | 726/12 |
| 2013/0017806 A1* | 1/2013 | Sprigg | .................... | H04M 1/66 |
| | | | | 455/411 |
| 2013/0254288 A1* | 9/2013 | Harrison | ................. | H04L 51/00 |
| | | | | 709/204 |

(Continued)

*Primary Examiner* — Teshome Hailu
(74) *Attorney, Agent, or Firm* — BakerHostetler

(57) ABSTRACT

Methods and systems for managing permission controls are disclosed. A method can comprise receiving a request to perform one or more restricted activities. The request can include at least an identifier of a first user associated with the request and an identification of the one or more restricted activities. The identifier of the first user associated with the request and/or the identification of the one or more restricted activities can be presented to a second user, such as an administrator. A response to the request can be provided by the second user and transmitted comprising information relating to one or more of a grant, denial, or modification of the performance of the one or more restricted activities. The transmitted response can be configured to be processed by the source to effect grant, denial, or modification of the performance of the one or more restricted activities.

20 Claims, 7 Drawing Sheets

(56) References Cited

U.S. PATENT DOCUMENTS

| | | | |
|---|---|---|---|
| 2013/0295903 A1* | 11/2013 | Kent, Jr. | H04M 1/66 |
| | | | 455/418 |
| 2014/0046830 A1* | 2/2014 | Orozco | G06Q 20/4016 |
| | | | 705/39 |
| 2014/0057648 A1 | 2/2014 | Lyman et al. | |
| 2014/0096029 A1* | 4/2014 | Schultz | G06F 3/0484 |
| | | | 715/747 |
| 2015/0309487 A1* | 10/2015 | Lyman | H04L 12/2827 |
| | | | 700/275 |
| 2016/0217638 A1* | 7/2016 | Child | G07C 9/00563 |
| 2016/0294775 A1* | 10/2016 | Mahadik | H04L 63/10 |

* cited by examiner

CONTENT PERMISSION PLATFORM

BACKGROUND

Content permissions can allow an administrator to block certain users from accessing certain content. For example, parental controls can allow parents to supervise the entertainment content their children can play by setting restrictions on content ratings, content schedule, content channels, and the like. Further, some hardware and software may provide a way to limit the movie content and website content that certain users (e.g., minor users) can view. However, using current systems, administrators must establish rules to govern the permissions relating to certain content and cannot address permissions requests in real-time. These and other shortcomings of the prior art are addressed by the present disclosure.

SUMMARY

Systems and methods of the present disclosure can provide remote control of user permissions by an administrator such as a parent, superior, manger, guardian, etc. User permissions can relate to content, premises control devices, access to networks or devices, vehicles, and other user interfacing elements.

In an aspect, methods can comprise receiving a request to perform one or more restricted activities. The request can include at least an identifier of a user associated with the request and an identification of the one or more restricted activities. The identifier of the user associated with the request and the identification of the one or more restricted activities can be presented. A response to the request can be received. The response can comprise information relating to one or more of a grant, denial, or modification of the performance of the one or more restricted activities. The response can be transmitted to a source of the request, wherein the transmitted response is configured to be processed by the source to effect grant, denial, or modification of the performance of the one or more restricted activities.

In an aspect, methods can comprise receiving first information relating to an attempt to perform one or more restricted activities. In response to receiving the first information, an alert may be presented relating to the one or more restricted activities and/or a request to perform the one or more restricted activities can be caused to be transmitted for approval. A response to the request to perform the restricted activities can be received and can comprise information relating to one or more of a grant, denial, or modification of the one or more restriction activities. A grant, denial, or modification of the performance of the one or more restricted activities can be implemented.

In an aspect, methods can comprise applying permission controls based on administrator location. As an example, when an administrator is outside a location zone, a permission control can be applied to one or more activities to restrict a performance of the one or more activities. As such, performance of the one or more of the restricted activities can be denied. Upon receiving the denial, a request can be made of the administrator to unrestrict the denied activities. If the administrator authorizes the request to access the restricted activities, performance of the one or more of the unrestricted activities can be allowed. Such authorization can be made remotely, while the administrator is outside the location zone (e.g., residence).

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
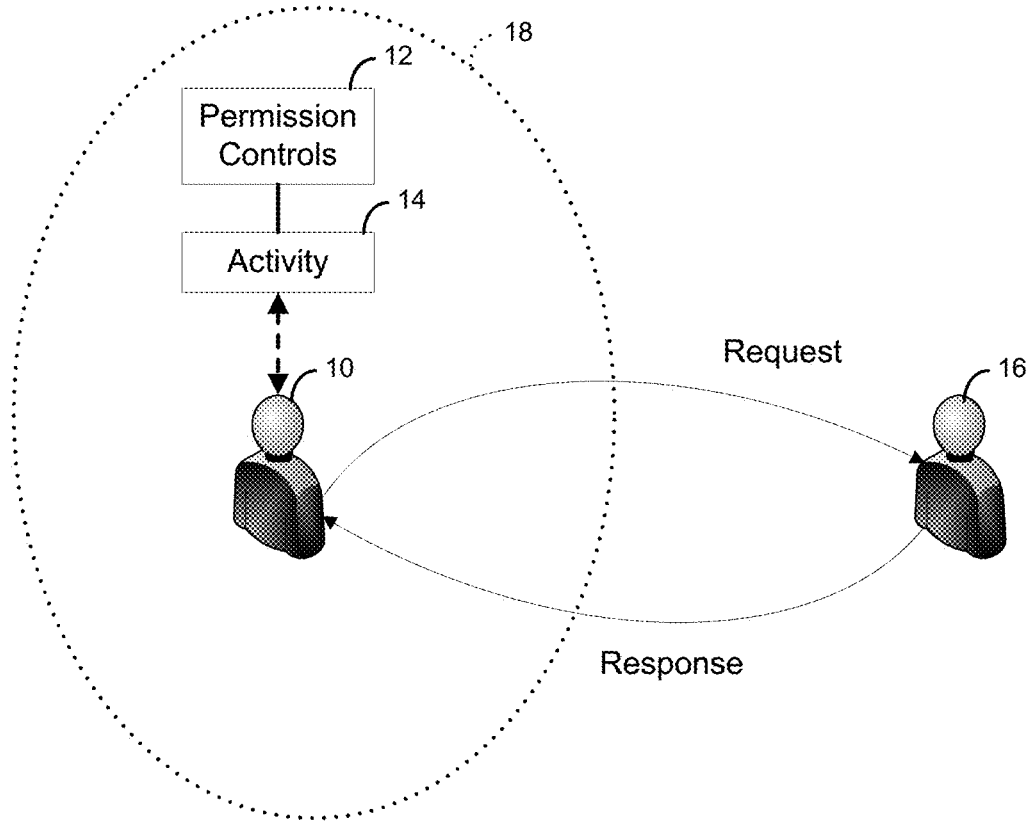
FIG. 1 is a block diagram of an example data flow.

In an aspect, systems and methods of the present disclosure can provide remote control of user permissions by an administrator such as a parent, superior, manger, guardian, etc. User permissions can relate to content, premises control devices, network devices, vehicles, and other user interfacing elements. FIG. 1 illustrates an example environment where one or more users 10 can be governed by permission controls 12 (e.g., parental controls, access controls, etc.). In an aspect, the one or more users 10 can be blocked from performing certain activities 14 (e.g., consuming content, accessing a network, adjusting home automation devices, accessing a premises, driving a vehicle, etc.) based at least upon the permission controls 12. As an example, an administrator 16 (e.g., parent, superior, manger, guardian, network operator, etc.) can configure the permission controls 12 for the one or more users 10. The permission controls 12 can comprise one or more rules or operations that restrict or otherwise control one or more activities. As such, when the one or more users 10 attempt to perform the one or more restricted activities, the performance is denied or restricted (e.g., blocked, limited, disallowed, etc.). However, the denied one or more users 10 can request (e.g., in real-time) permission from the administrator 16. As an example, the administrator 16 can receive a permission request and can decide whether or not to allow performance of the requested activity. As a further example, the request can comprise information relating to the activity to be performed, which the administrator 16 may use in making a decision to allow. The administrator 16 can decide to allow the activity and may transmit a response to the request. The administrator 16 can decide to modify the permission controls 12 and/or the one or more activities to which the permission controls 12 are applied. In certain aspects, the response to the request can be automatically processed to unblock the performance of the requested activity. In other aspects, the response to the request can be automatically processed to provide alternatives to the blocked performance of the requested activity.

In certain aspects, the one or more users 10 may request remote permissions from the administrator 16 when the administrator 16 is outside of a particular location zone 18 (e.g., geo-fenced area, premises, etc.). For example, it can be determined when the administrator is outside the location zone 18. Accordingly, when the administrator 16 is outside the location zone 18, the permission controls 12 can be applied and the one or more users 10 can request permissions from the remote administrator 16. As described in more detail herein, the real-time request for permission to perform an activity can be applied in various control environments including, but not limited to, consuming content, accessing a network, adjusting home automation devices, accessing a premises, driving a vehicle, and the like.

Figure 2:
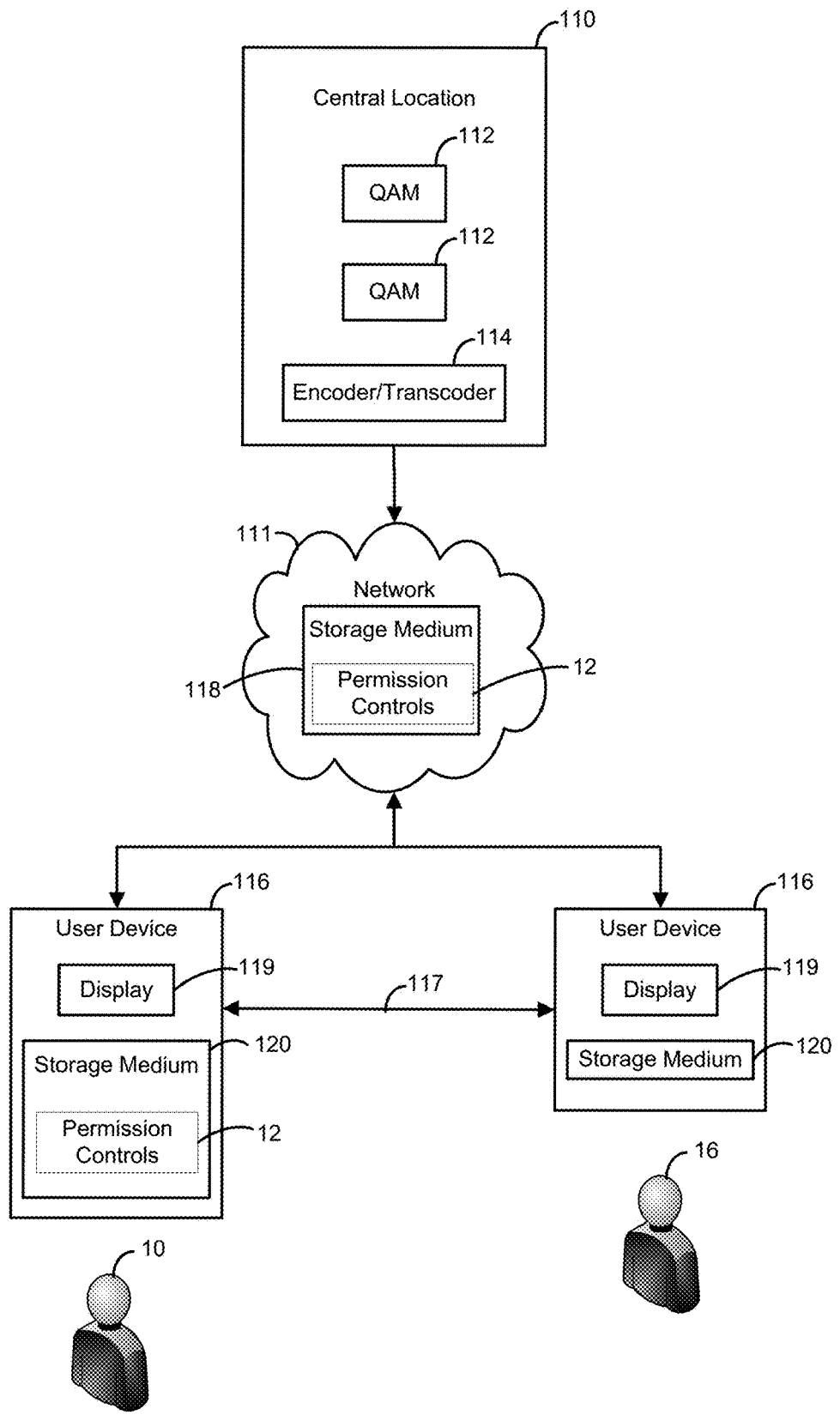
FIG. 2 is a block diagram of an example system and method.

FIG. 2 illustrates various aspects of an example network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware. Although one or more figures illustrate television content type data, the disclosure can be practiced with any data.

The system and network can comprise a central location 110 (e.g., a headend, or processing facility), which can receive content (e.g., data, input programming) from multiple sources. The central location 110 can combine the content from the various sources and can distribute the content to user locations (e.g., device location) via a distribution system and/or network, such as network 111.

In an aspect, the central location 110 can be a data processing facility configured to receive content from a variety of sources. The content can be transmitted from the source to the central location 110 via a variety of transmission paths, including wireless and terrestrial paths. As an example, the central location 110 can deliver IP video. The central location 110 can comprise one or a plurality of signal modulators such as quadrature amplitude modulation (QAM) devices 112 that can be associated with an input source. The QAM devices 112 can convert received content into a modulated output signal suitable for transmission over the network 111. MPEG encoders, such as an encoder 114, can be included for encoding/transcoding data such as content. As an example, a data packaging device, such as a fragmentor, can be integrated with the encoder 114 (or separate and in communication with the encoder 114) to package the encoded/transcoded content. In an aspect, the encoder 114 and/or fragmentor can repeatedly embed markers, flags, and signals into the content data stream for processing by downstream devices.

The network 111 can be configured to distribute signals from the central location 110 to user and/or device locations, such as a location of user device 116. The network 111 can be an optical fiber network, a broadband network, a coaxial cable network, a hybrid fiber-coaxial network, a wireless network, a satellite system, a direct broadcast system, or any combination thereof. There can be a multitude of user locations connected to network 111. In an aspect, the network 111 can comprise a storage medium 118. As an example, the storage medium 118 can be configured as network storage such as cloud storage accessible by one or more user devices 116. As a further example, a number of content assets (e.g., video, audio, etc.) can be loaded into the storage medium 118 and stored for playback or processing by the one or more user devices 116. However, other data, content, and/or information can be stored in the storage medium 118 such as permission rules, content restriction information, and alternative content and/or information relating to the permission controls 12. In an aspect, the storage medium 118 can be separate from the network 111. For example, the storage medium 118 can be located upstream of the user devices 116 and downstream of the network 111. As another example, the storage medium 118 can store information to be transmitted to any number of the user devices 116 or other recipient devices. As a further example, the user devices 116 can process a data stream, which can comprise audio, video, or other data from the network 111 with a regular cadence (e.g., every two seconds, four seconds, ten seconds, and the like). Other data and tracks can be received and processed by the user devices 116. In certain aspects, multiple user devices 116 can communicate via a communication path 117 such as a communication network (e.g., wireless communication, or other communication mechanism).

In an aspect, the user device 116 can be configured as a decoder, such as a gateway, set-top box, or communications terminal (CT) to decode, if needed, the signals for display on a display device, such as on a display 119. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's, displays 119, central locations 110, DVR's, home theater PC's, and the like. As an example, the user device 116 can receive signals from the network 111 for rendering content via the user device 116. As an example, rendering content can comprise providing audio and/or video, displaying images, facilitating an audio or visual feedback, tactile feedback, and the like. However, other content can be rendered via the user device 116. In an aspect, the user device 116 can be a CT, a set-top box, a television, a computer, a smartphone, a laptop, a tablet, a multimedia playback device, a portable electronic device, and the like configured to cause playback of content. As an example, the user device 116 can be an Internet Protocol compatible device for receiving signals via a network such as the Internet or some other communications network for providing content to the user. It is understood that other display devices and networks can be used. It is further understood that the user device 116 can be a widget or a virtual device for displaying content in a picture-in-picture environment such as via the display 119, for example.

In an aspect, the user device 116 can comprise a storage medium 120. As an example, a number of content assets (e.g., video, audio, etc.) can be written to the storage medium 120 and stored for playback or processing (e.g., tick play) by the associated user device 116. However, other data, content, and/or information can be stored in the storage medium 120 such as information relating to the permission controls 12. In an aspect, the storage medium 120 can be separate from the user device 116 and in communication with the user device 116 such as via a portable flash drive.

In an aspect, a particular user (e.g., one or more users 10) can be blocked from performing certain activities such as consuming particular content based at least upon the permission controls 12. As an example, an administrator (e.g., administrator 16 can configure the permission controls 12 to block content based on various parameters such as ratings, playback time, consumption allocation, location, and the like. The permission controls 12 can comprise one or more rules or operations that restrict access to particular content. As such, when the user attempts to consume the content, the performance is denied (e.g., blocked, limited, disallowed, etc.). However, the denied user can request (e.g., in real-time) permission from the administrator. As an example, the administrator can receive a permission request and can decide whether or not to allow the user to consume the content. As a further example, the request can comprise information relating to the activity to be performed, which the administrator may use in making a decision to allow. Such information can comprise contextual information relating to the requested content, alternatives to the requested content, alternative content versions (e.g., clean version), and the like. The administrator can decide to allow the user to the content and may transmit a response to the request. The administrator can decide to modify the permission controls 12 and/or the one or more activities to which the permission controls 12 are applied. In certain aspects, the response to the request can be automatically processed to unblock the content. In other aspects, the response to the request can be automatically processed to provide alternatives to the blocked content. The requests and responses can be transmitted/received via one or more communications channels such as via the network 111 or other network.

Figure 3:
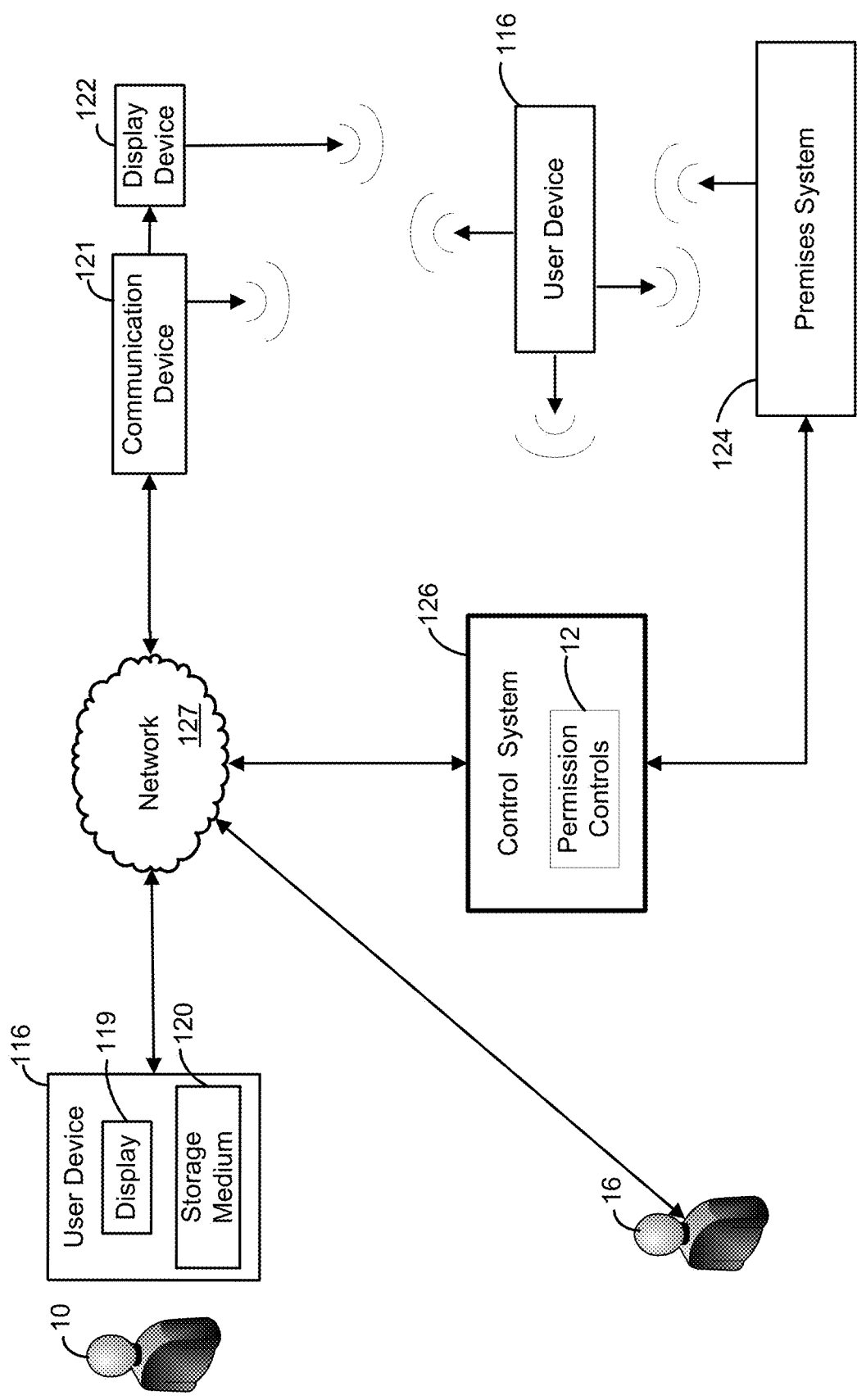
FIG. 3 is a block diagram of an example system and method.

FIG. 3 illustrates an example system and network in which the systems and methods of the disclosure can operate. In an aspect, one or more user devices 116 (e.g., portable computing devices, controllers, user interface, etc.) can be configured to interface with one or more of a communication device 121, a premises system 124, and/or a control system 126. The communication device 121 can be or comprise a network gateway, communications terminal (CT), set-top box, another user device (e.g., tablet, smart phone, portable computer, personal computer, etc.) The communication device 121 can be configured to decode, if needed, signals for display on a display device 122, such as on a television set (TV) or a computer monitor. Various wireless devices may also be connected to the network at, or proximate, a location of the user device 116.

In an aspect, the premises system 124 can be configured to monitor and or control an environment such as a premises (e.g., enclosure, house, office, etc.). As an example, the premises system 124 can comprise a premises security system. The security system can detect motion of objects within or near the premises. The security can detect the opening of entries such as windows or doors. As a further example, the premises system 124 can comprise an automated premises system configured to control HVAC, premises lighting, electronics, entry locks, automated systems, water systems, appliances, and the like. The automated premises system can be configured to measure environmental conditions such as ambient light, temperature, pressure, humidity, and the like.

In an aspect, one or more of the communication device 121, the premises system 124, or other device or system can be in communication with the control system 126 or device or element. The control system 126 can be disposed remotely from one or more of the communication device 121 and/or the premises system 124 and in communication via a network 127. As an example, the control system 126 can be integrated with the user device 116. As another example, the control system 126 can comprise control software for managing one or more operational functions of the user device 116. As a further example, the control system 126 can be integrated with one or more of the communication device 121, the premises system 124, or other device or system. The control system 126 can be configured to communicate (e.g., wired or wirelessly, uni-directionally or bi-directionally, over RF, IR, WiFi, Bluetooth, and/or other protocols or spectrums) with a controller such as the user device 116. As an example, the control system 126 can be configured to store and/or process the permission controls 12.

In an aspect, a particular user (e.g., one or more users 10) can be blocked from performing certain activities such as modifying settings of the premises system 124 based at least upon the permission controls 12. As an example, an administrator (e.g., administrator 16 can configure the permission controls 12 to block the modifications to the settings of the premises system 124 based on various parameters. As such, when the user attempts to modify settings of the premises system 124, the performance is denied (e.g., blocked, limited, disallowed, etc.). However, the denied user can request (e.g., in real-time) permission from the administrator. As an example, the administrator can receive a permission request and can decide whether or not to allow the user to modify the settings of the premises system 124. As a further example, the request can comprise information relating to the activity to be performed, which the administrator may use in making a decision to allow. Such information can comprise contextual information relating to the modification to the settings. The administrator can decide to allow the user to the content and may transmit a response to the request. The administrator can decide to modify the permission controls 12 and/or the one or more activities to which the permission controls 12 are applied.

In an aspect, one or more triggering endpoints (e.g., user device 102) can communicate with a cloud based rules engine. Triggering endpoints can be or comprise a set top box, smart television, mobile device (app or operating system), router, personal computer, vehicle, and the like. The cloud based rules engine can contain rule definitions relating to the permission for one or more users. As an example, the cloud based rules engine can maintain a log of each instance where a rule definition is invoked. As another example, a cloud based notification engine can operate as a bus, managing requests for permission and permission responses. The notification engine can reference user notification preferences (e.g., SMS, MMS, Email, push notification, home console notification, activity feed, etc.), can maintain a log of each response, and can synchronize responses across notification options.

In operation, a triggering endpoint can synchronize with the cloud based rules engine via a radio intermediary (e.g., WiFi, Bluetooth, Zigbee, etc.). The triggering endpoint can trigger a parental control block (rule invocation) when a managed user interacts in a way that conflicts with the rule definitions. A managed user can send a request for permission to the supervising user. The request for permission may contain meta data (e.g., text (title, rating, description, URL, etc.), trailer, video clip, sound clip, etc.) to describe the action being requested. The cloud based rules engine can communicate to the notification engine to determine where and how to contact and deliver the managed user's request for permission to the supervising user. The notification engine can reference defined user notification preferences to determine the most appropriate method of delivery. A request for permission can be transmitted to the supervising user. A supervising user can respond to the request for permission in the method received, or via any other medium to where the notification engine also posted the request for permission. The supervising user permission response can be routed back through the notification engine to the cloud rules engine where it is then directed back to the triggering endpoint with the permission response. A permission response can include a message for the triggering endpoint to allow or deny the content in question, open a bridge for a dedicated chat between the managed user and the supervising user, display a message from the supervising user (SMS, MMS, voice, etc.), and or, carry a response from the supervising user to modify the rule definition. The permission response is then received by the triggering endpoint. A record of the triggering endpoint, permission request, permission response, etc. is kept on the rules engine to prevent rule redundancy.

Figure 4:
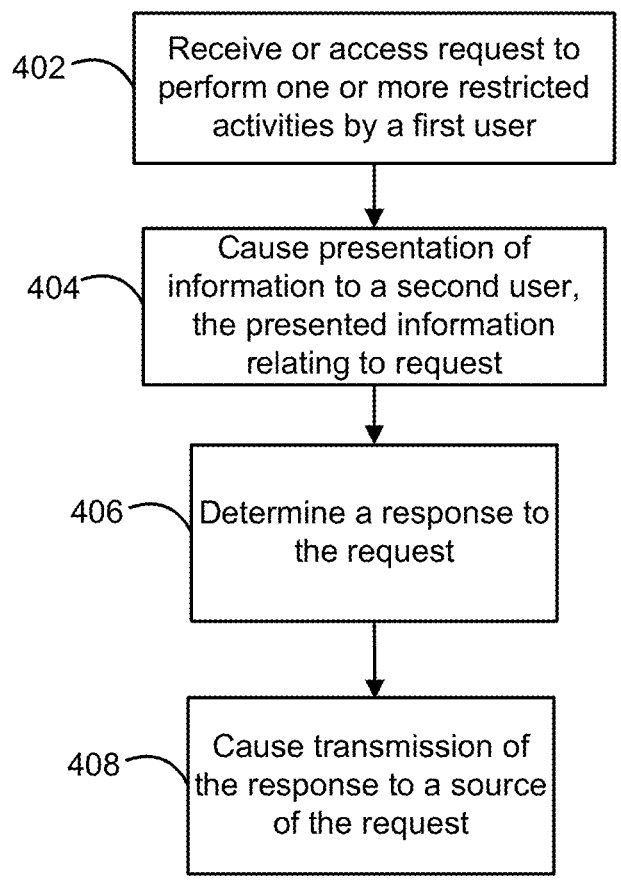
FIG. 4 is a flow chart of an example method.
Figure 5:
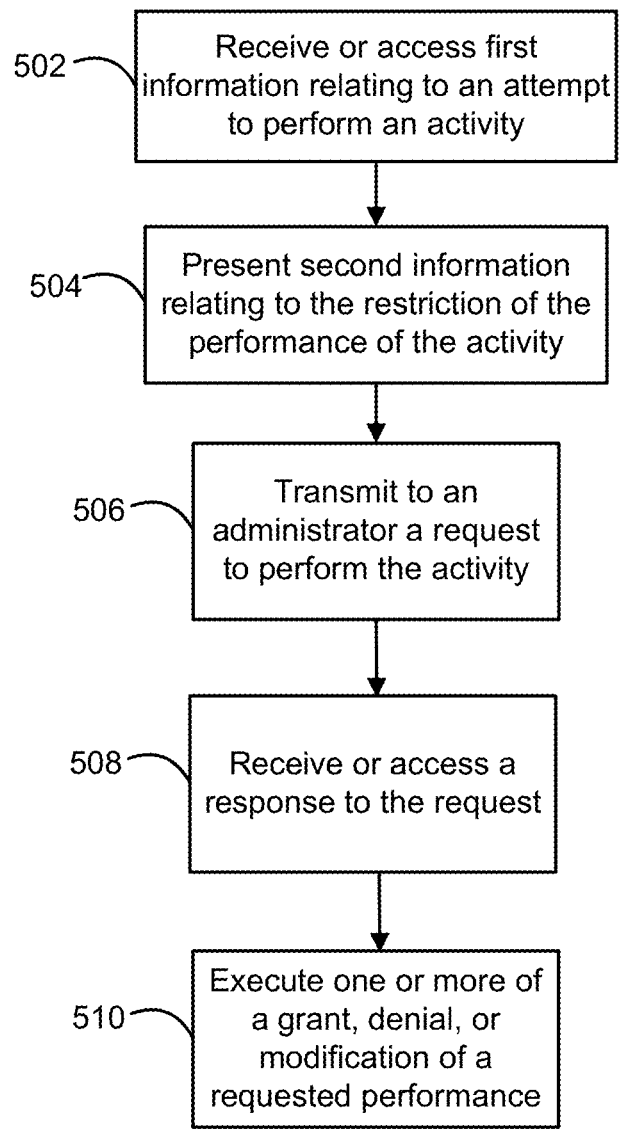
FIG. 5 is a flow chart of an example method.
Figure 6:
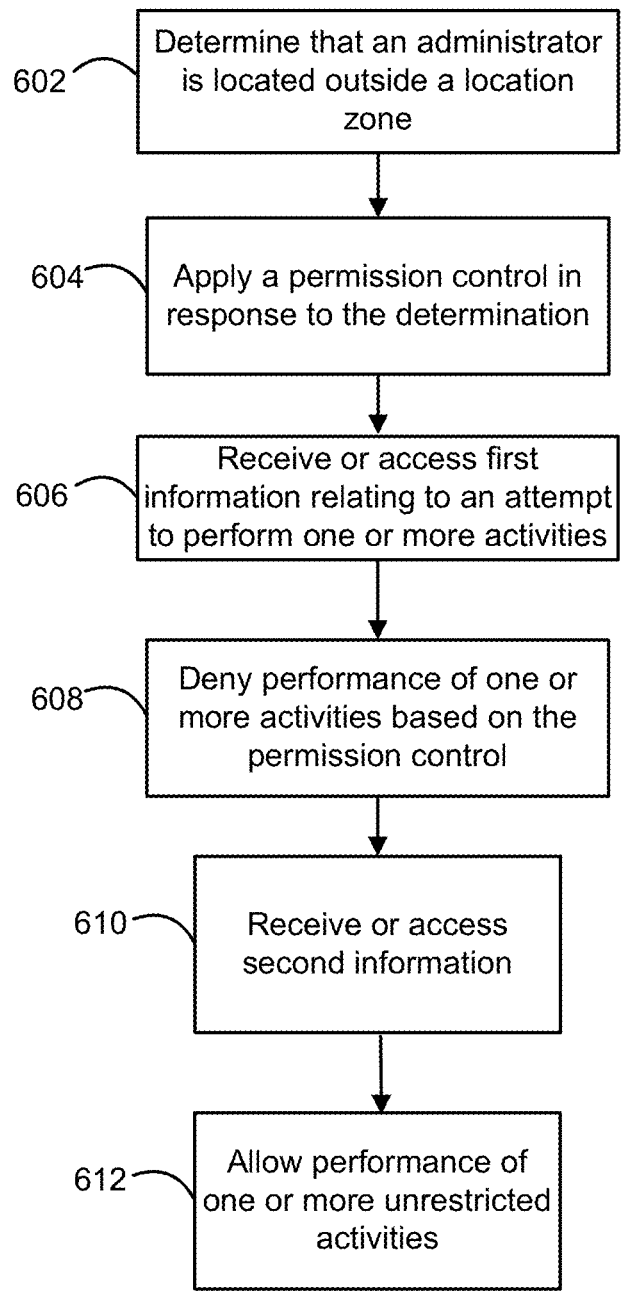
FIG. 6 is a flow chart of an example method.

FIGS. 4-6 illustrate operating procedures that can be used to manage permission controls for accessing content and/or services. In an aspect, FIG. 4 depicts example operating procedures that may be implemented by the systems and networks described herein.

As an example, in operation or step 402, a request can be received or accessed by a computing device, such as a device configured to communicate with an administrator. In an aspect, the request can be or comprise a request to perform one or more restricted activities by a first user. The one or more restricted activities can comprise content consumption, interaction with a premises device, access to a premise, access to a portion of a premises, operation of a vehicle, access to a vehicle, or a combination thereof. As an example, the request can comprise at least an identifier of a user associated with the request and an identification of the one or more restricted activities. The request can comprise contextual information relating to the one or more restricted activities. The request can comprise a time range, rating information, allocation information, location information, or alternatives to the one or more restricted activities, or a combination thereof.

In operation or step 404, information relating to the request can be caused to be presented to an intended recipient of the request, such as a second user (e.g., an administrator). In an aspect, the information can be presented via a user interface such as a display or output device of a user device. As an example, the identifier of the user associated with the request and the identification of the one or more restricted activities can be displayed. As a further example, the identifier of the user associated with the request and the identification of the one or more restricted activities can be presented audibly.

In operation or step 406, a response to the request can be determined (e.g., accessed or received) by the computing device or devices that received the request. In an aspect, the response can comprise information relating to one or more of a grant, denial, or modification of the performance of the one or more restricted activities. As an example, the response to the request can be received as a user-provided input or as a selection of one or more options presented to a recipient of the request, or both.

In operation or step 408, the response (e.g., at least a portion of the response) can be caused to be transmitted, for example, to a source of the request. The transmitted response can be configured to be processed by the source to effect grant, denial, or modification of the performance of the one or more restricted activities. In certain aspects, a remote administrator can be notified of requests to access restricted activities by a first user and the administrator can control the grant or denial of such requests from a remote location. As an example, permission control (e.g., one or more permission rules) can be applied to a user device. As such, a permission control block (e.g., rule invocation) can be executed when a managed user interacts with the user device in a way that conflicts with the rule definitions.

As such, the managed user may not be able to access certain services or content. In response to the block, a managed user can send a request for permission to the supervising user (administrator). The request for permission may contain meta data (e.g., text, title, rating, description, URL, content trailer, video clip, sound clip, etc.) to describe the action being requested. The supervising user can respond to the request for permission in the method received, or via any other medium to where the notification engine also posted the request for permission. A permission response can include a message for the user device to allow or deny the content in question, open a bridge for a dedicated chat between the managed user and the supervising user, display a message from the supervising user (SMS, MMS, voice, etc.), and or, carry a response from the supervising user to modify the rule definition. The permission response is then received by the user device.

FIG. 5 depicts example operating procedures that may be implemented by the systems and networks described herein. In operation or step 502, first information can be received or accessed for example by one or more computing devices (e.g., user device 116, control system 126, etc.). In an aspect, the first information can relate to an attempt to perform one or more restricted activities. The one or more restricted activities can comprise content consumption, interaction with a premises device, access to a premise, access to a portion of a premises, operation of a vehicle, access to a vehicle, or a combination thereof.

In operation or step 504, second information can be presented relating to the restriction of the one or more restricted activities, in response to receiving the first information. For example, an alert message can be caused to display on a user device associated with the attempt to perform one or more restricted activities. Such an alert message can include information about a denial of access to the restricted activities. The alert massage can include options to override the denial, such as an administrator code or password. Other options can include the generation of a request from permission to access the restricted activities.

In operation or step 506, a request to perform the one or more restricted activities can be transmitted, for example to an administrator. The administrator can be anyone who has authority to manage permission controls for another user. As an example, the administrator can be a parent, superior, manger, guardian, another user, and the like. The request can be transmitted in response to a user receiving the alert message of step 504. The request can comprise contextual information relating to the one or more restricted activities. The request can comprise a time range, rating information, allocation information, location information, or alternatives to the one or more restricted activities, or a combination thereof.

In operation or step 508, a response to the request can be received or accessed by the computing device associated with the restricted activities. The response can comprise information relating to one or more of a grant, denial, or modification of the one or more restriction activities. As an example, the response can be received from an administrator based on a review of the request. In operation or step 510, one or more of grant, denial, or modification of the performance of the one or more restricted activities can be executed. Such execution can be performed by a computer device associated with the user that caused the request to be transmitted.

In certain aspects, permission control (e.g., one or more permission rules) can be applied to a user device. As such, a permission control block (e.g., rule invocation) can be executed when a managed user interacts with the user device in a way that conflicts with the rule definitions. As such, the managed user may not be able to access certain services or content. As an example, an alert message can be displayed on the user device associated with the managed user to identify that the permission control block has been executed and that certain services and/or content is not accessible. In response to the block, a managed user can send a request for permission to the supervising user (administrator). The request for permission may contain meta data (e.g., text, title, rating, description, URL, content trailer, video clip, sound clip, etc.) to describe the action being requested. The supervising user can respond to the request for permission. A permission response can include a message for the user device to allow or deny the content in question, open a bridge for a dedicated chat between the managed user and the supervising user, display a message from the supervising user (SMS, MMS, voice, etc.), and or, carry a response from the supervising user to modify the rule definition. The permission response is then received by the user device.

FIG. 6 depicts example operating procedures that may be implemented by the systems and networks described herein. In operation or step 602, it can be determined that an administrator is outside a location zone. In an aspect, the location zone can be or comprise a premises or a geo-fenced area, or both. The administrator can be anyone who has authority to manage permission controls for another user. As an example, the administrator can be a parent, superior, manger, guardian, another user, and the like. As a further example, a determination of whether the administrator is outside the location zone can be made based on a loss in local area network connection, a global positioning, a video recognition, one or more near field sensors, and the like. Such determination can be based on a location associated with a user device of the administrator or other traceable device.

In operation or step 604, in response to the determination that the administrator is outside the location zone, a permission control can be applied to one or more activities to restrict a performance of the one or more activities. The one or more restricted activities can comprise content consumption, interaction with a premises device, access to a premise, access to a portion of a premises, operation of a vehicle, access to a vehicle, or a combination thereof.

In operation or step 606, first information can be received or accessed for example by one or more computing devices (e.g., user device 116, control system 126, etc.). In an aspect, the first information can relate to an attempt to perform one or more restricted activities. The one or more restricted activities can comprise content consumption, interaction with a premises device, access to a premise, access to a portion of a premises, operation of a vehicle, access to a vehicle, or a combination thereof. In operation or step 608, in response to the first information, performance of the one or more of the restricted activities can be denied.

In operation or step 610, second information can be received or accessed comprising authorization to unrestrict the one or more restricted activities. The second information can comprises a determination that the administrator is inside the location zone. The second information can comprise a response to a request for permission. As an example, a response to the request can be received or accessed by the computing device associated with the restricted activities. The response can comprise information relating to one or more of a grant, denial, or modification of the one or more restriction activities. As an example, the response can be received from an administrator based on a review of the request. In operation or step 612, performance of the one or more of the unrestricted activities can be allowed.

In certain aspects, permission control (e.g., one or more permission rules) can be applied to a user device based upon the location of a supervising user, such as an administrator. As an example, when the supervising user exits the premises where a managed user is interacting with a user device, certain permission control can be activated. As such, a permission control block (e.g., rule invocation) can be executed when a managed user interacts with the user device in a way that conflicts with the rule definitions. The permission control block can restrict access to certain services or content. When the managed user attempts to access the restricted services or content, a notice (e.g., request for permission) can be sent to the supervising user. The notice can be an informative message relating to the attempt made by the managed user. The notice can comprise one or more options including, for example, an option to unrestricted certain content or services. The supervising user can respond to the request for permission. The response can include a message for the user device to allow or deny the content in question, open a bridge for a dedicated chat between the managed user and the supervising user, display a message from the supervising user (SMS, MMS, voice, etc.), and or, carry a response from the supervising user to modify the rule definition. The permission response is then received by the user device and the user device can allow or deny access to certain activities based on the response.

Figure 7:
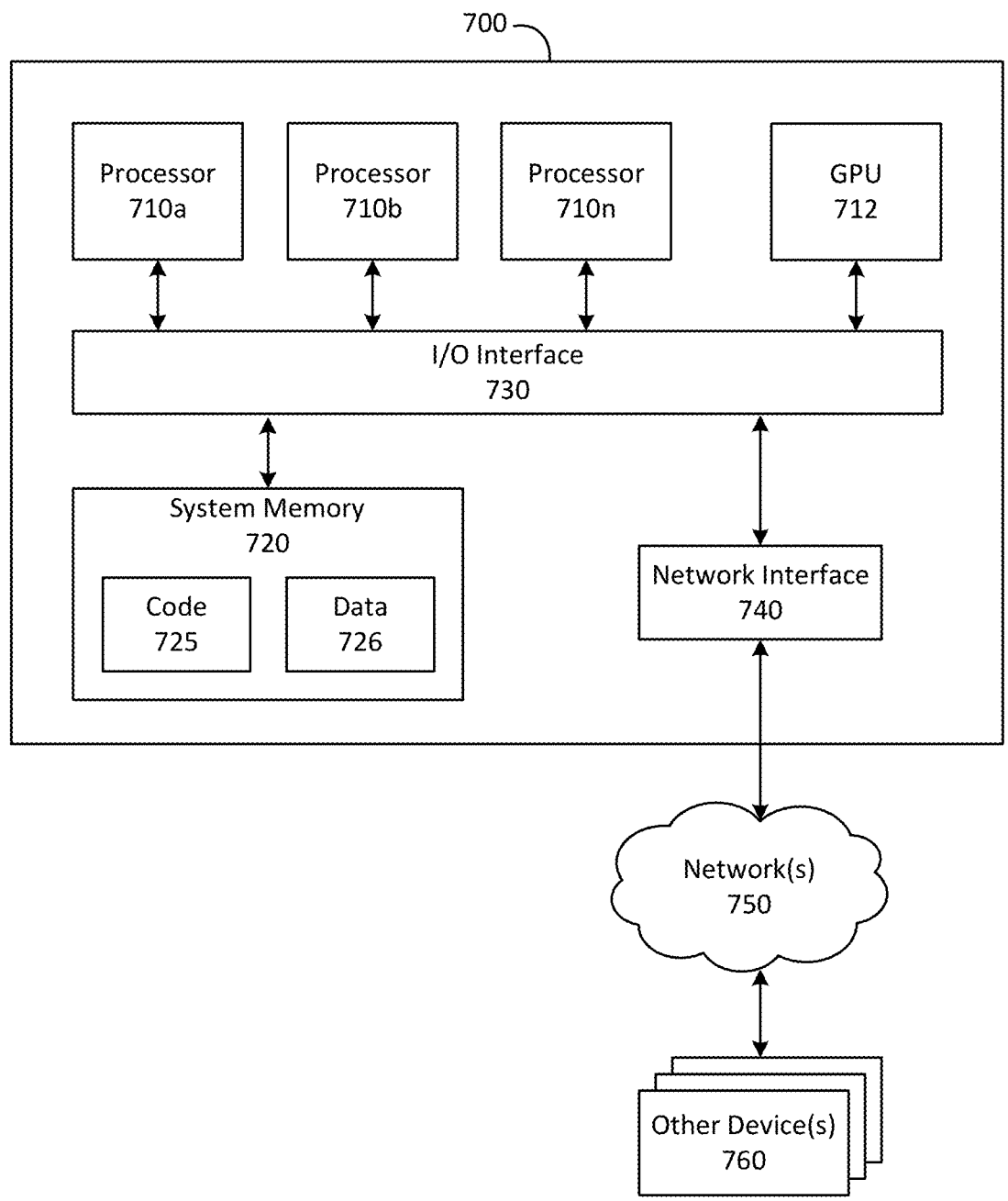
FIG. 7 is a block diagram of an exemplary computing system.

FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
    receiving a request to perform one or more activities, wherein the request comprises at least an identifier of a first user associated with the request and an identification of the one or more activities;
    applying, based on a determination that the first user is inside a location zone and a second user is outside the location zone, a permission control to the one or more activities to restrict a performance of the one or more activities;
    sending, to the second user, a message requesting the second user to approve or disapprove performance of the one or more restricted activities;
    receiving, from the second user in response to the message, an indication of one of approval or disapproval of performance of the one or more restricted activities; and
    sending, based on the indication and to the source of the request, a response configured to effect the one of approval or disapproval of performance of the one or more restricted activities.

2. The method of claim 1, wherein the request further includes contextual information relating to the one or more restricted activities.

3. The method of claim 1, wherein the request further includes a time range, rating information, allocation information, location information, or alternatives to the one or more restricted activities, or a combination thereof.

4. The method of claim 1, wherein the one or more restricted activities comprise content consumption, interaction with a premises device, access to a premise, access to a portion of a premises, operation of a vehicle, access to a vehicle, or a combination thereof.

5. The method of claim 1, wherein the method further comprises, based on a determination that the first user and the second user are inside the location zone, sending, to the first user, a response configured to effect approval of performance of the one or more restricted activities.

6. The method of claim 1, wherein the message is received as a user-provided input or as a selection of one or more options presented to a recipient of the request, or both.

7. The method of claim 1, wherein the response is transmitted via a network communications channel and the second user is an administrator of the first user.

8. The method of claim 1, wherein the one or more restricted activities comprise content consumption of on-demand content and wherein the response is configured to be processed by the source to allow the first user access to a selected version of the on-demand content.

9. The method of claim 1, wherein the one or more restricted activities comprise interaction with a premises management system.

10. A method comprising:
    determining that a first user is inside a location zone and a second user is outside a location zone;
    applying, based on the determining that the first user is inside the location zone and the second user is outside the location zone, a permission control to one or more activities to restrict a performance of the one or more activities;
    receiving first information relating to an attempt to perform the one or more restricted activities by the first user;
    causing presentation of second information relating to the restriction of the one or more restricted activities, in response to receiving the first information;
    based on the determining that the first user is inside the location zone and the second user is outside the location zone, and further based on the applying the permission control, sending, to the second user, a message requesting the second user to approve or disapprove performance of the one or more restricted activities;
    receiving, from the second user in response to the message, an indication of one of approval or disapproval of performance of the one or more restricted activities; and
    sending, based on the indication and to the source of the request, a response configured to effect the one of the approval or disapproval of the one or more restricted activities.

11. The method of claim 10, wherein the request further includes contextual information relating to the one or more restricted activities.

12. The method of claim 10, wherein the request further includes a time range, rating information, allocation information, location information, or alternatives to the one or more restricted activities, or a combination thereof.

13. The method of claim 10, wherein the one or more restricted activities comprise content consumption, interaction with a premises device, access to a premise, access to a portion of a premises, operation of a vehicle, access to a vehicle, or a combination thereof.

14. The method of claim 10, wherein the method further comprises, based on a determination that the first user and the second user are inside the location zone, sending, to the first user, a response configured to effect approval of performance of the one or more restricted activities.

15. A method comprising:
    determining that a user is inside a location zone and determining that an administrator is outside a location zone;
    applying, based on the determining that the user is inside the location zone and based on the determining that the administrator is outside the location zone, a permission control to one or more activities to restrict a performance of the one or more activities;
    receiving first information relating to an attempt to perform one or more of the restricted activities;
    denying performance of the one or more of the restricted activities;
    receiving second information comprising authorization to unrestrict the one or more restricted activities; and
    allowing performance of the one or more of the unrestricted activities.

16. The method of claim 15, wherein the location zone comprises a premises or a geo-fenced area, or both.

17. The method of claim 15, wherein the one or more restricted-activities comprise content consumption, interaction with a premises device, access to a premise, access to a portion of a premises, operation of a vehicle, access to a vehicle, or a combination thereof.

18. The method of claim 15, wherein the second information comprises a determination that the administrator is outside the location zone.

19. The method of claim 15, wherein the second information comprises a response to a request for permission.

20. The method of claim 15, wherein the method further comprises:
   determining that the administrator is inside the location zone; and
   allowing, based on the determining that the administrator is inside the location zone, performance of the one or more activities.

* * * * *